United States Patent [19]

Betters

[11] 3,900,993
[45] Aug. 26, 1975

[54] GAME CALL DEVICE

[76] Inventor: Paul D. Betters, 60 Main St., Oakfield, N.Y. 14125

[22] Filed: Aug. 3, 1973

[21] Appl. No.: 385,231

[52] U.S. Cl............................ 46/180; 84/375
[51] Int. Cl.............................. A63h 5/00
[58] Field of Search......... 46/180; 84/330, 376, 375

[56] References Cited
UNITED STATES PATENTS

| | | | |
|---|---|---|---|
| 2,274,375 | 2/1942 | Montenare | 84/375 |
| 2,603,120 | 7/1952 | Rosenheim | 84/376 |
| 3,002,318 | 10/1961 | Carver | 84/330 X |
| 3,282,144 | 11/1966 | Knott | 84/375 |
| 3,774,572 | 11/1973 | Barraccio | 84/376 |

Primary Examiner—Louis G. Mancene
Assistant Examiner—J. Q. Lever
Attorney, Agent, or Firm—Mason, Fenwick & Lawrence

[57] ABSTRACT

An animal call device for use in simulating game calls, embodying a conventional airoperated sound producing assembly having an elongated extensible and contractible bellows attached in an air-tight manner to the sound producing assembly. The bellows is constructed so that when the device is held with the voice assembly upright and the bellows hanging downwardly, the bellows has a normal equilibrium position which is generally midway intermediate the fully extended and fully compressed positions and has sufficient weight distribution for actuating the sound producing assembly when the operator holds the assembly between his fingers with the bellows extending downwardly without said bellows contacting anything and rapidly moves the sound producing assembly up and down along the axis of the bellows to extend and compress the bellows thereby forcing air in alternate directions through the sound producing assembly.

2 Claims, 4 Drawing Figures

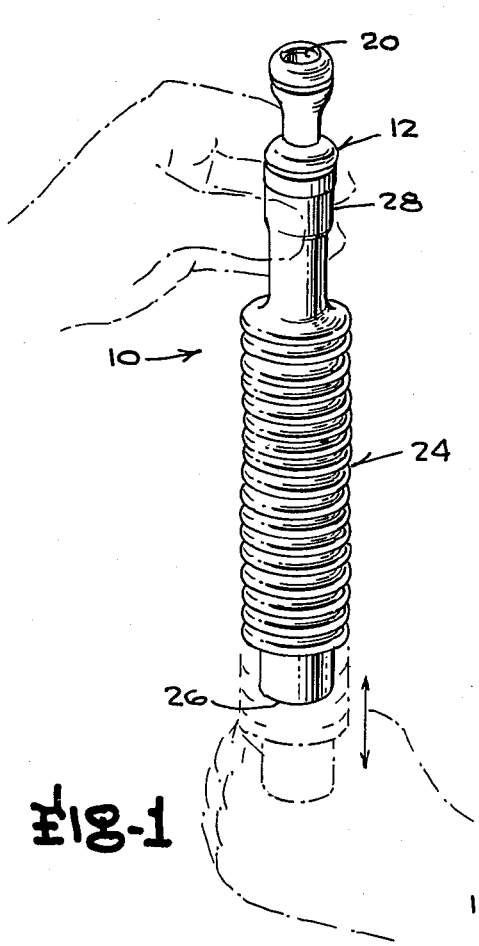
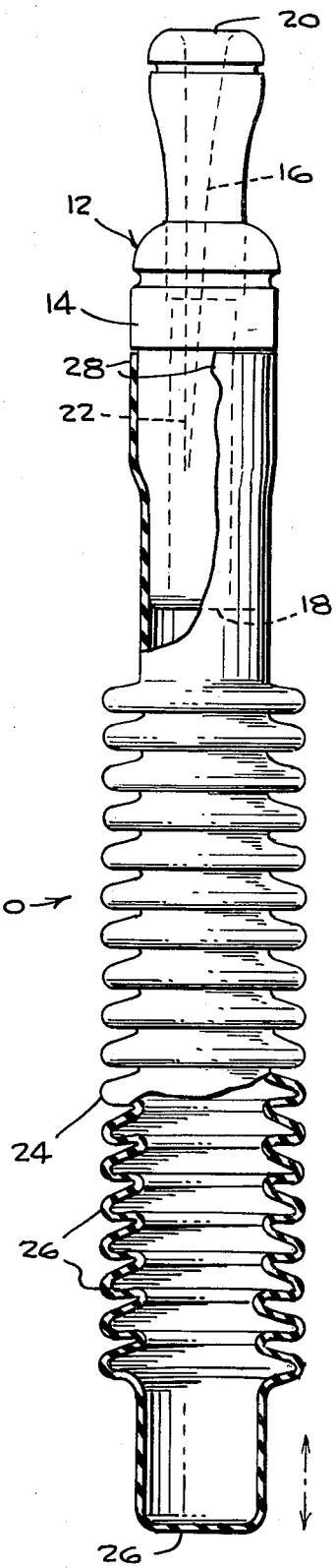
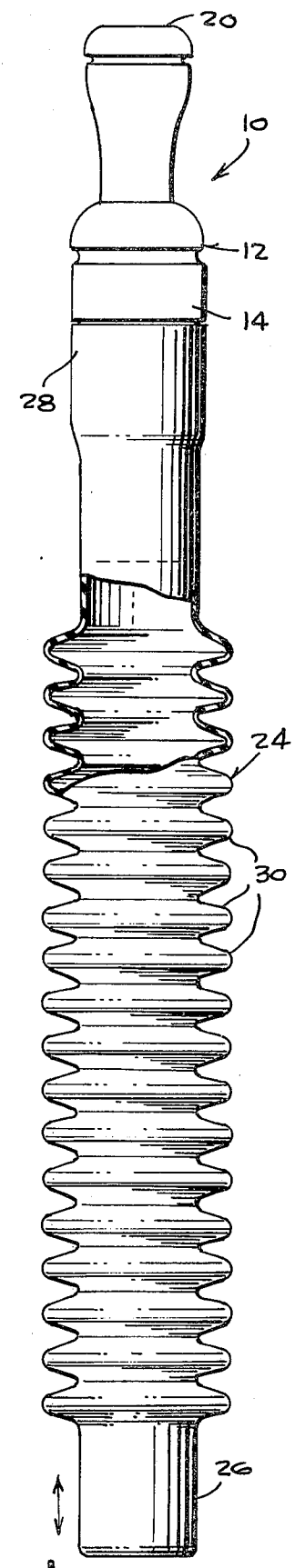
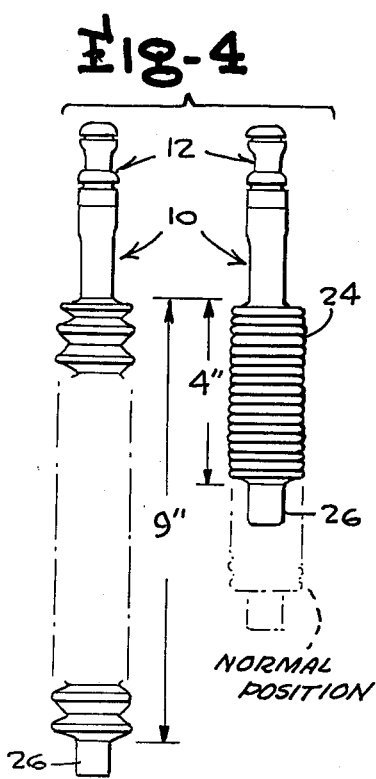
Fig-1
Fig-4
Fig-2
Fig-3

GAME CALL DEVICE

BACKGROUND OF INVENTION

The present invention relates generally to a device for simulating game bird and animal calls and more particularly to a game call device utilizing a highly flexible bellows in combination with a conventional air-operated sound producing assembly to operably move air through the assembly.

U.S. Pat. No. 2,782,558 issued to Harley shows a broadly similar animal call device utilizing a conventional air-operated sound producing assembly in combination with a long limp tube which is closed at one end and attached to the sound producing assembly thereof at the other end. This call is actuated by vigorously manually shaking the tube in a swinging, non-axial manner which causes rapid intake and expulsion of air through the assembly to produce a continuous chatter which simulates a duck feed call. A major limitation of this prior art device resides not only in the difficulty of or absence in being able to control and change both the tone and volume of the sound, but also a lesser ease of operation both at close hand and at remote stations.

Accordingly, it is the principal object of the present device to provide an improved game call device adapted to change both tone and volume which is particularly useful for calling geese or turkeys and the like, where two different tones and volumes are usually necessary to produce effective results.

Another object of the present invention is to provide a novel game call device which will produce superior quality calls of potentially longer duration and more realistic character.

A further object of this invention is to provide a novel game bird or animal call device which may be operated with at locations either in the vicinity of the user or remotely therefrom.

BRIEF SUMMARY OF INVENTION

The foregoing and other objects are achieved by providing an elongated generally conventional air operated sound producing assembly, such as one having center air passage provided with a vibratory reed, together with an attached flexible bellows for generating an air flow therethrough. An improved form of bellows is attached in air tight relation on one end of the body member of the sound producing assembly. A unique feature resides in designing the bellows so that in its normal or natural state it has an equilibrium position which inherently maintains the convolutions of the bellows in a substantial partially retracted or contracted condition, instead of in a normally essentially fully extended condition. Furthermore, another improvement resides in maintaining a ratio of the lengths of the extendable ring or convolution portion when in the respectively fully extended and fully retracted conditions at more than 2:1, and a sufficient outer to inner diameter relationship to assure a sufficiently ample flow of air to accentuate inflection or tone variations and provide the proper duration for the simulated calls, particularly those of geese. By the unique weight distribution and design the bellows portion, the call device is nearly self-operating by particularly any form of physical disturbance. The unique ease of operation enables the call device to be remotely operated as by simply pulling on a string suitably strung and attached to a suspended call device.

Other objects and advantages of the invention will become apparent to those persons having ordinary skill in the art to which the present invention pertains from the following more detailed description taken in conjunction with the accompanying drawings.

BRIEF DESCRIPTION OF DRAWING FIGURES

FIG. 1 is a perspective view of an embodiment of the invention; and

FIGS. 2 and 3 are side elevational views of the embodiment shown in FIG. 1, illustrating portions thereof in cross-section, and partially contracted and partially extended positions; and FIG. 4 is a composite diagrammatic view showing one preferred comparative ratio relationship between the fully contracted or generally non-operative condition, on the right side, and the generally fully extended operative condition on the left side of the figure.

PREFERRED EMBODIMENT

Referring to the drawing figures, there is illustrated a preferred embodiment of the invention, the overall unit of which is generally designated by the reference numeral 10. This assembly, which may be used to simulate various game calls, generally embodies a conventional air-operated sound producing assembly 12 consisting of an elongated body 14 having a generally central, longitudinal air passageway 16 provided with an inlet port 18 and an outlet port 20. The sound producing assembly further is provided with an air actuated reed 22 disposed within passageway 16, as best illustrated in FIG. 2. The rest of unit 10 comprises an elongated, flexible, bellows 24, to be described in greater detail hereinafter.

Reed 22 is adapted to vibrate responsive to air moving through passageway 16 accordingly, by controlling the rate and volume of air flow, the user can simulate various game calls. Sound producing assembly 12 is actuated by the readily extensible and contractible bellows 24 fabricated with thin convoluted walls constructed of a flexible, air impervious elastomeric or rubber material. Bellows 24 has a closed free end 26 and an opposite open end 28 which is fitted over the inlet end of assembly 12 to form an airtight seal therebetween.

In conventional mouth-operated game calls, the user would normally blow into the inlet port 18. With the present invention, air is drawn and ejected through air passageway 16 simply by physically disturbing the bellows. It is apparent that the air is alternately drawn in and thus compressively forced back into the inlet opening 18 and in so doing alternately passes through the center passageway where it vibrates reed 22.

In the preferred embodiment the bellows comprises a relatively large plurality of uniform, deep corrugations 30 provided between the cylindrical open upper end 28 and the cylindrical closed lower end 26.

Furthermore, the flexible bellows material used in the fabrication thereof is of such a nature that the weight distribution thereof permits the requisite easy operable extension and contraction thereof responsive to a simple manual or light shaking of the device. Hence, the bellows will operate quite easily and in the manner of a rubber compression spring. The rubber spring principle eliminates the need for any additional weight to be attached, or for any excessive oblique shaking in operation.

A further important design feature resides in the relative size of the bellows rings. They are fabricated so that the outside diameter of the bellows is considerably larger than the inside diameter thereof, in one form being preferably approximately 2 to 1. A preferred ratio of the fully extended and fully contracted lengths of the convoluted portions bellows also is 2 to 1. For example, when in the fully contracted condition, the length of the combined rings is approximately 4 inches, whereas when in the fully extended condition the overall length should be approximately 9 inches. It is apparent that the device may be made in a variety of different sizes, but in each instance this general minimum ratio is preferred. It is also apparent that the volume is increased as the ratio is increased. In this improved call device the bellows disc-like walls of the rings are made significantly wider than in the known prior art device, so as to provide for the additional air necessary to accentuate the simulated sounds of the goose with this call device. In the known similar prior art device the ratio of the bellows rings outer diameter and lengths was significantly less than 2:1 whereby volume and tone control was virtually impossible. It also disclosed the necessity of adding a weight to the lower free end of the bellows so that it would impart a preferred increased flexing and oblique wobble to the device.

The call device may be used by the hunter in a number of different ways. He may manually hold the sound producing assembly 12 generally vertically between the fingers of one hand so that bellows 24 extends downwardly, and with the closed end 26 of the bellows in the other hand, as shown in FIG. 1. Then by manually moving the assembly up and down essentially along the axis of the bellows, the bellows will act as an air pump, thereby forcing air through the sound producing assembly to produced the desired sound. The same results can be achieved by not holding the lower closed end, but by just letting the bellows hang freely while lightly moving the voice assembly up and down along the axis of the bellows. In this manner, the bellows will extend and contract very easily and naturally, thereby generating the necessary air flow through the sound producing assembly. By varying the speed, the hunter controls the rate of air flow through the voice assembly without the need to impart any radial wobble, and can control both the tone and volume of the call, which is particularly useful when imitating the sound of geese. The hunter may also operate the device in a remote location by suspending it on a string on a support preferably with the bellows extending downwardly and controlling the bellows by a simple pulling on a string either from above or below. This option permits the hunter to operate a number of calls simultaneously or in sequence at remote locations.

From the foregoing detailed description, it will be evident that there are a number of changes, adaptations and modifications of the present invention which will come within the province of those persons having ordinary skill in the art. However, it is intended that all such variations not departing from the spirit of the invention be considered as within the scope thereof as limited solely by the appended claims.

I claim:

1. An animal call comprising an air actuated, sound producing assembly having an air inlet port, and a closed, variable volume chamber communicating with said air inlet port, said variable volume chamber including a first end section fitted onto said sound producing assembly in an airtight relation, a second closed end section and an intermediate bellows section means having an equilibrium condition disposed generally midway intermediate its fully extended and fully retracted conditions and having sufficient weight distribution for actuating the sound producing assembly when the operator holds the assembly between his fingers with the intermediate bellows section means extending downwardly without said variable volume chamber contacting anything and rapidly moves the sound producing assembly up and down along the axis of the bellows means to extend and compress the bellows means thereby forcing air in alternate directions through the sound producing assembly.

2. A game call according to claim 1 wherein said variable volume chamber is formed of rubber having a sufficient stiffness to bias the bellows section thereof into said equilibrium condition.

* * * * *